(12) United States Patent
Niva et al.

(10) Patent No.: US 7,774,156 B2
(45) Date of Patent: Aug. 10, 2010

(54) PORTABLE APPARATUS FOR MONITORING USER SPEED AND/OR DISTANCE TRAVELED

(75) Inventors: Arto Niva, Jääli (FI); Jukka Jaatinen, Kempele (FI); Mika Niemimäki, Haukpudas (FI)

(73) Assignee: Polar Electro Oy, Kempele (FI)

( * ) Notice: Subject to any disclaimer, the term of this patent is extended or adjusted under 35 U.S.C. 154(b) by 285 days.

(21) Appl. No.: 11/777,064

(22) Filed: Jul. 12, 2007

(65) Prior Publication Data

US 2009/0015421 A1 Jan. 15, 2009

(51) Int. Cl.
*G01P 5/00* (2006.01)
*G01P 7/00* (2006.01)

(52) U.S. Cl. .......................... 702/142; 702/158; 482/8; 340/670

(58) Field of Classification Search ........................ None
See application file for complete search history.

(56) References Cited

U.S. PATENT DOCUMENTS

| | | | | |
|---|---|---|---|---|
| 4,566,461 A * | 1/1986 | Lubell et al. ................. 600/481 |
| 4,625,732 A | 12/1986 | Kasa et al. |
| 4,625,733 A | 12/1986 | Saynajakangas |
| 5,636,146 A * | 6/1997 | Flentov et al. ............... 702/176 |
| 6,013,007 A * | 1/2000 | Root et al. ...................... 482/8 |
| 6,052,654 A * | 4/2000 | Gaudet et al. ................ 702/160 |
| 6,122,960 A * | 9/2000 | Hutchings et al. ............. 73/493 |
| 6,336,891 B1 * | 1/2002 | Fedrigon et al. ............... 482/8 |
| 6,356,856 B1 * | 3/2002 | Damen et al. ................ 702/160 |
| 6,736,759 B1 * | 5/2004 | Stubbs et al. ................... 482/8 |
| 6,805,006 B2 * | 10/2004 | Guzman ....................... 73/490 |
| 7,245,254 B1 * | 7/2007 | Vogt ...................... 342/357.06 |
| 7,254,516 B2 * | 8/2007 | Case et al. ................... 702/182 |
| 7,467,060 B2 * | 12/2008 | Kulach et al. ............... 702/141 |
| 7,512,515 B2 * | 3/2009 | Vock et al. ................... 702/141 |
| 7,519,327 B2 * | 4/2009 | White ........................ 455/41.2 |
| 7,617,071 B2 * | 11/2009 | Darley et al. ................. 702/165 |
| 2003/0163287 A1 * | 8/2003 | Vock et al. ................... 702/187 |
| 2004/0177531 A1 * | 9/2004 | DiBenedetto et al. ......... 36/132 |
| 2006/0136173 A1 * | 6/2006 | Case et al. ................... 702/182 |
| 2007/0082789 A1 | 4/2007 | Nissila et al. |
| 2007/0208531 A1 * | 9/2007 | Darley et al. ................. 702/142 |

FOREIGN PATENT DOCUMENTS

| | | | |
|---|---|---|---|
| EP | 1066793 A2 * | 1/2001 |
| WO | WO 99/18480 A1 | 4/1999 |
| WO | WO 2006/065679 A2 | 6/2006 |

* cited by examiner

*Primary Examiner*—Eric M Blount
(74) *Attorney, Agent, or Firm*—Hoffman & Baron, LLP

(57) ABSTRACT

A portable apparatus including an interface configured to input first motion data of a user from a foot-worn first self-contained activity determining unit is disclosed. The portable apparatus also includes a second self-contained activity determining unit configured to determine second motion data of the user. Furthermore, the portable apparatus includes a processing unit configured to determine and store a user-specific dependency between the first motion data and the second motion data, and determine a current speed of the user or a current traveled distance of the user based on current second motion data and the user-specific dependency.

20 Claims, 3 Drawing Sheets

US 7,774,156 B2

PORTABLE APPARATUS FOR MONITORING USER SPEED AND/OR DISTANCE TRAVELED

BACKGROUND OF THE INVENTION

1. Field of the Invention

The invention relates to a portable apparatus comprising an interface configured to input motion data of a user from a foot-worn self-contained activity determining unit.

2. Description of the Related Art

The connection between the portable apparatus and the foot-worn self-contained activity determining unit may lose motion data, especially if the connection is wireless. Such losses may be due to external interference, or they may relate to anthropometric parameters of the user, for example. Consequently, the motion data may become less reliable or accurate. Furthermore, the battery of the foot-worn activity determining unit may run out during exercise, leaving the user of the portable apparatus without desired information. As the foot-worn activity determining unit and the portable apparatus are separate pieces of equipment, the user may leave the foot-worn activity determining unit at home, and the portable apparatus may become useless because of this.

SUMMARY OF THE INVENTION

The present invention is directed to a portable apparatus, which includes an interface, a second self-contained activity determining unit, and a processing unit. The interface is configured to input first motion data of a user from a foot-worn first self-contained activity determining unit. The second self-contained activity determining unit is configured to determine second motion data of the user. The processing unit is configured to determine and store a user-specific dependency between the first motion data and the second motion data, and determine a current speed of the user or a current traveled distance so of the user based on current second motion data and the user-specific dependency.

BRIEF DESCRIPTION OF THE DRAWINGS

Embodiments of the present invention are described below, by way of example only, with reference to the accompanying drawings, in which.

DETAILED DESCRIPTION OF THE PREFERRED EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Figure 1:
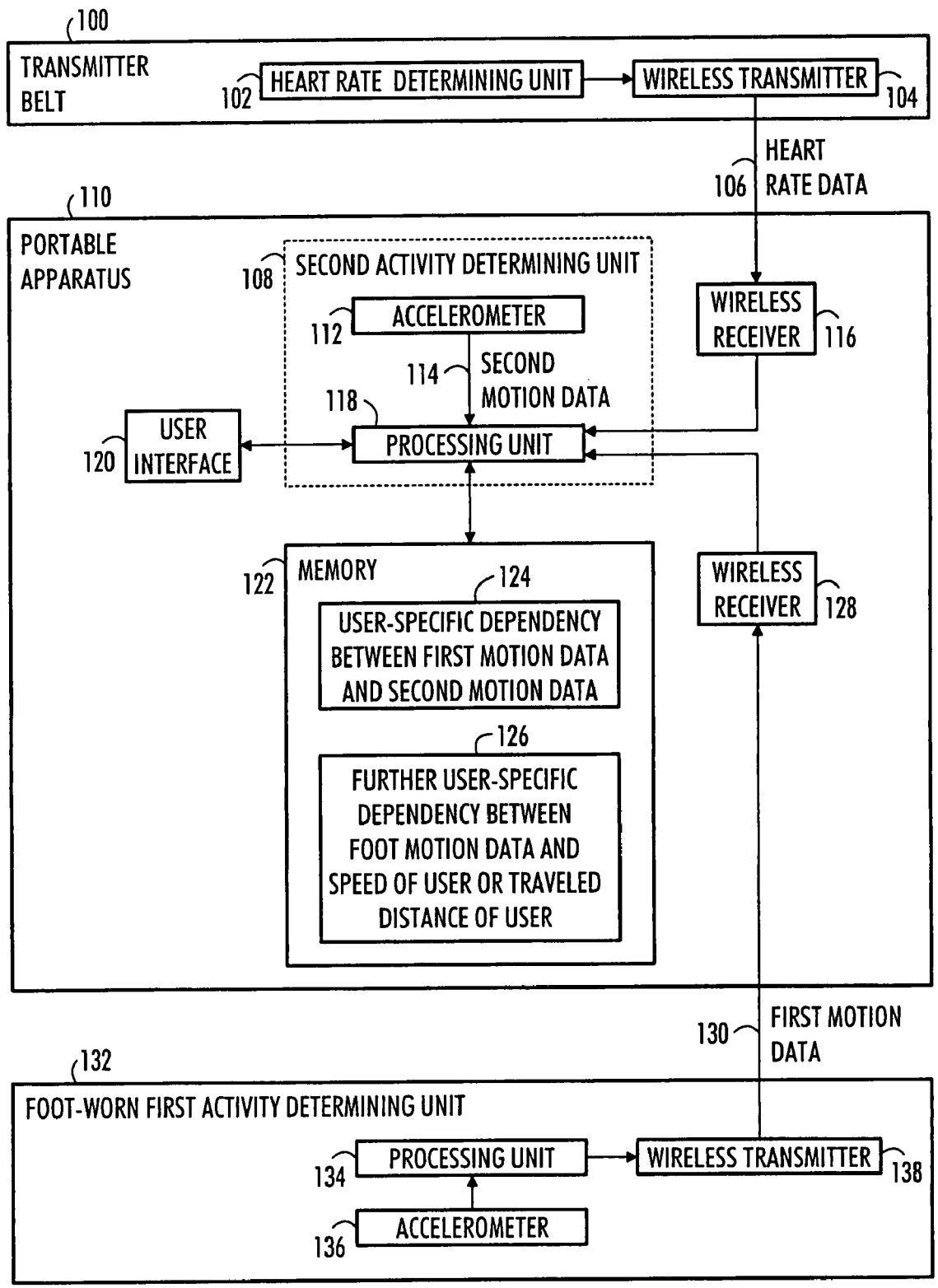
FIG. 1 illustrates embodiments of a portable apparatus and a foot-worn activity determining unit.

FIG. 1 illustrates a portable apparatus 110, a foot-worn first activity determining unit 132, and a transmitter belt 100. FIG. 1 is a simplified block diagram only showing some elements and functional entities, all being logical units whose implementation may differ from what is shown. The connections shown in FIG. 1 are logical connections; the actual physical connections may be different. It is apparent to a person skilled in the art that the described equipment also comprise other functions and structures. It should be appreciated that the functions, structures, elements and the protocols used for communication are irrelevant to the actual invention. Therefore, they need not to be discussed in more detail here. The specifications of portable apparatuses develop rapidly. Such development may require extra changes to an embodiment. Therefore, all words and expressions should be interpreted broadly and they are intended to illustrate, not to restrict, the embodiment.

The portable apparatus 110 comprises an interface 128 configured to input first motion data 130 of a user from the foot-worn first self-contained activity determining unit 132. As illustrated in FIG. 1, the interface 128 may be a wireless receiver 128 receiving the first motion data signal 130.

The portable apparatus 110 also comprises a second self-contained activity determining unit 108 configured to determine second motion data 114 of the user. As illustrated in FIG. 1, the second activity determining unit 108 may be implemented so that at least one accelerometer 112 feeds raw second motion data 114 to a processing unit 118. Alternatively, the accelerometer 112 may include its own processing unit capable of determining speed and/or distance data from the raw acceleration data and feed the speed and/or distance data 114 to the processing unit 118.

Furthermore, the portable apparatus 110 comprises a processing unit 118 configured to determine and store a user-specific dependency 124 between the first motion data 130 and the second motion data 114, and determine a current speed of the user or a current traveled distance of the user based on the current second motion data 114 and the user-specific dependency 124. The user-specific dependency 124 may be stored in a memory 122. In effect, the portable apparatus learns 110 the user-specific dependency between the first motion data 130 and the second motion data 114. There may be stored a general dependency in the portable apparatus 110 as a starting point, but the teaching of the portable apparatus 110 with the foot-worn first activity determining unit 132 improves the accuracy considerably. In the end, the portable apparatus 110 is capable of producing quite accurate speed and/or traveled distance data without the first motion data 130. Specifically, the user-specific dependency 124 may be used to improve the accuracy of the speed and/or traveled distance data in such cases where the first motion data 130 is unavailable, such as being occasionally lost due to radio interference.

The processing unit 118 may be deemed as a miniature electronic digital computer, which may comprise a working memory (RAM), a central processing unit (CPU), and a system clock. The CPU may comprise a set of registers, an arithmetic logic unit, and a control unit. The control unit is controlled by a sequence of program instructions transferred to the CPU from the RAM. The control unit may contain a number of microinstructions for basic operations. The implementation of microinstructions may vary, depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

Some part of the functionality of the processing unit 118 may be implemented as a computer program embodied on a distribution medium, comprising program instructions which, when loaded into the processing unit 118, constitute the aforementioned functionality. The computer program may be in source code form, object code form, or in some intermediate form, and it may be stored in some sort of carrier, which may be any entity or device capable of carrying the program. Such carriers include a record medium, computer memory, read-only memory, electrical carrier signal, telecommunications signal, and software distribution package, for example.

The processing unit 118 may be implemented as a processor with software, but various hardware implementations are also feasible, such as a circuit consisting of logic components or one or more application-specific integrated circuits ASIC. The interface 128 and the second activity determining unit 108 may be separate ASICs or integrated circuits. The processor may be, for example, an 8-bit microprocessor, type S1C8F manufactured by Seiko-Epson®. If necessary, there may be more than one processor. A hybrid of these different implementations is also feasible. When designing the implementation, a person skilled in the art will consider the requirements set for the size and power consumption of the apparatus 110, necessary processing capacity, production costs, and production volumes, for example.

The foot-worn first activity determining unit 132 comprises an accelerometer 136. The accelerometer 136 measures its own motion, acceleration, i.e. the rate of change of velocity, and converts the acceleration into an electric signal. Acceleration can be expressed by the unit of measurement g. One g is the acceleration caused to an object by the earth's gravity. Accelerations between −2 to +2 g can usually be measured from human movement. Due to its implementation, the accelerometer 136 may belong to microelectromechanical systems (MEMS).

Various techniques may be used for measuring acceleration. Piezo-resistor technology employs material whose resistance changes as it compresses. The acceleration of mass produces a force in a piezo resistor. If constant current is supplied through the piezo resistor, its voltage changes according to the compression caused by acceleration. In piezo-electric technology, a piezo-electric sensor generates charging when the sensor is accelerated. In silicon bridge technology, a silicon chip is etched so that a silicon mass remains on it at the end of a silicon beam. When acceleration is directed to the silicon chip, the silicon mass focuses a force on the silicon beam, thus changing the resistance of the silicon beam. Micro-machined silicon technology is based on the use of a differential capacitor. Voice coil technology is based on the same principle as a microphone. Examples of suitable movement sensors are: Analog Devices ADXL105, Pewatron HW or VTI Technologies SCA series. The implementation of the accelerometer 136 may also be based on other appropriate techniques, for example on a gyroscope integrated into a silicon chip or on a micro vibration switch incorporated into a surface mounting component.

It is also to be noted that the accelerometer 136 may measure the acceleration in one, two or three dimensions. Instead of just one accelerometer 136, also two or even three separate accelerometers each measuring a different dimension may be utilized. European patent application 1 066 793 describes the use of at least a pair of accelerometers which may be mounted on an athletic shoe, for example.

The foot-worn first activity determining unit 132 may also comprise a wireless transmitter 138 for transmitting the first motion data 130 to the wireless receiver 128 of the portable apparatus 110.

Furthermore, the foot-worn first activity determining unit 132 may comprise a processing unit 134. The processing unit 134 may process the raw acceleration data received from the accelerometer 136 in order to determine the speed and/or the traveled distance of the user wearing the foot-worn first activity determining unit 132. Hence, the first motion data 130 may comprise the speed of the user and/or the traveled distance of the user.

Alternatively, the first motion data 130 comprises foot motion data of the user. In such a case, the processing unit 118 of the portable apparatus 110 is further configured to store a further user-specific dependency 126 between the foot motion data and the speed of the user or a traveled distance of the user, and utilize the further user-specific dependency 126 in the determination of the current speed of the user or the current traveled distance of the user.

The portable apparatus 110 may be a wrist-worn apparatus, or a subscriber terminal of a radio system such as a mobile phone, for example. The portable apparatus 110 may also be a sports watch for use as an instrument in sports, or a so-called pedometer. In the wrist-worn apparatus 110, the electronics components shown in FIG. 1 are protected by a cover (which is usually waterproof. In addition, the wrist-worn apparatus 110 comprises a wristband for attaching the device to the wrist. Hence, the accelerometer 112 of the portable apparatus 110 is usually, during use in the wrist of the user, in the hand of the user, attached to a string and hanging from the user, or in the pocket of the user. The accelerometer 112 of the portable apparatus 110 may be implemented with similar techniques as the accelerometer 136 of the foot-worn first activity determining unit 132, taking into account the difference in the placing of the accelerometer 136, 112, i.e. foot vs. hand/torso. A foot-worn accelerometer 136 may produce kinematic results for a stride, i.e. acceleration in a selected direction, velocity in a selected direction or distance in a selected direction. Hand/torso motion data, in the form of signal frequency, signal power or some other parameter derived from the signal, may be obtained from a hand/torso-worn accelerometer 112, but the described user-specific dependency 124 between the first motion data 130 and the second motion data 114 is needed in order to calibrate the data from the hand/torso-worn accelerometer 112 in order to arrive at an accurate speed and/or traveled distance estimate.

If the first motion data 130 is transferred wirelessly from the foot-worn first activity determining unit 132 to the portable apparatus 110, any suitable standard/non-standard wireless communication technique may be used. Such techniques include Bluetooth® radio transmission or proprietary radio transmission. The proprietary radio transmission may operate in 2.4 GHz or 5 kHz frequency, for example.

The portable apparatus 110 may comprise a user interface 120. The user interface 120 typically comprises a display, means for producing sound, and a keyboard. The display may be a liquid crystal display, for example, but it may also be implemented by any appropriate prior art technique. The means for producing sound may be a loudspeaker or a simpler means for producing beeps or other sound signals. The keyboard may comprise a complete qwerty keyboard, a mere numeric keypad or only a few push buttons and/or rotary buttons. In addition, the user interface 120 may comprise other prior art user interface elements, for example various means for focusing a cursor (mouse, track ball, various arrow keys, etc.) or elements enabling audio control. The speed of the user and/or the traveled distance of the user may be shown on the user interface 120, on the display, for example.

The portable apparatus 110 may also be capable of communicating with a transmitter belt 100. The transmitter belt 100 is worn around the chest of the user and it comprises a heart rate determining unit 102 which measures the users heart rate, and a wireless transmitter 104 configured to transmit heart rate data 106 to a wireless receiver 116 of the portable apparatus 110. The portable apparatus 110 may thus be a heart rate monitor for measuring the user's heart rate, and possibly other parameters that can be measured non-invasively (such as blood pressure). In U.S. Pat. No. 4,625,733, which is incorporated herein by reference, Säynäjäkangas describes a wireless and continuous heart rate monitoring concept where a transmitter to be attached to the user's chest measures the user's ECG-accurate (electrocardiogram) heart rate and transmits the heart rate information telemetrically to the heart rate receiver attached to the users wrist using magnetic coils in the transmission. The heart rate monitor can also be implemented so that, instead of the solution consisting of a transmitter/receiver, the heart rate is measured directly from the wrist based on the pressure, for example. Other prior art methods for measuring the heart rate may also be employed, provided that they are suitable for use in a portable personal data processing device.

Polar Electro® (www.polarusa.com) designs and manufactures heart rate monitors and their accessories. At the writing of this patent application, the portable apparatus 110 may be implemented based on the Polar RS800sd Running Computer, the foot-worn first activity determining unit 132 may be implemented based on the Polar s3 stride sensor W.I.N.D., and the transmitter belt 100 may be implemented based on the Polar WearLink 31 coded transmitter, for example. The foot-worn first activity determining unit 132 may also be called a footpod.

Naturally, as the products evolve, also the feasible platforms for the implementation of the embodiments described in this patent application evolve and emerge.

Figure 2:
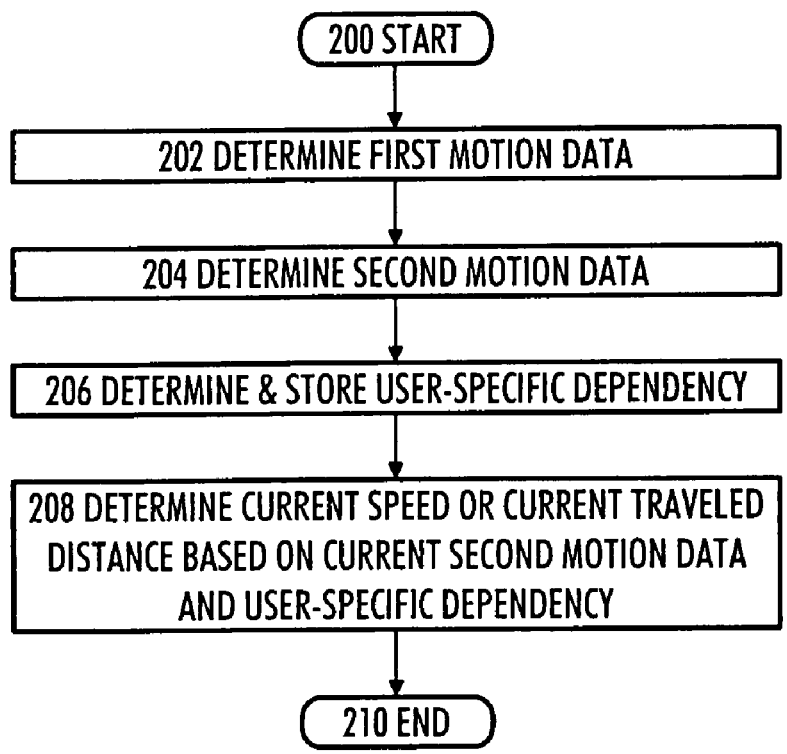
FIGS. 2, 3 and 4 illustrate embodiments of a method.
Figure 3:
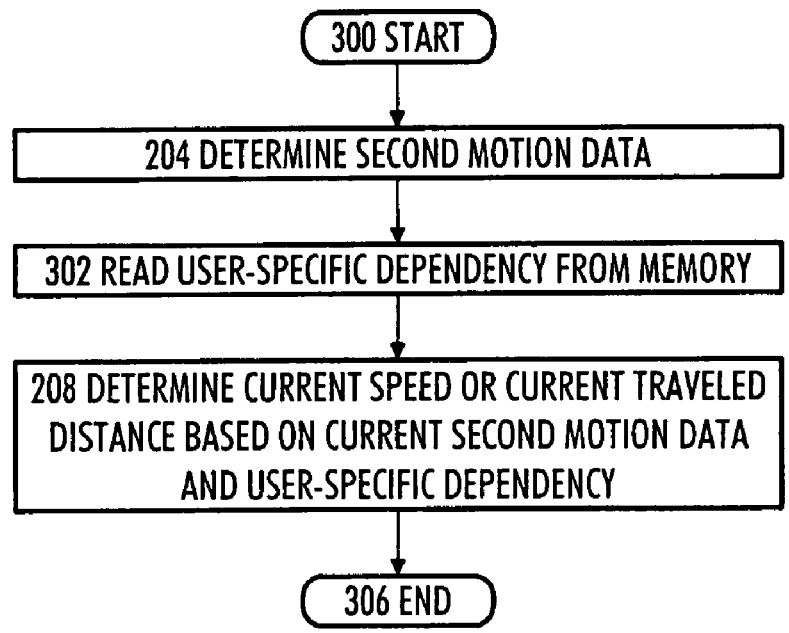
Figure 4:
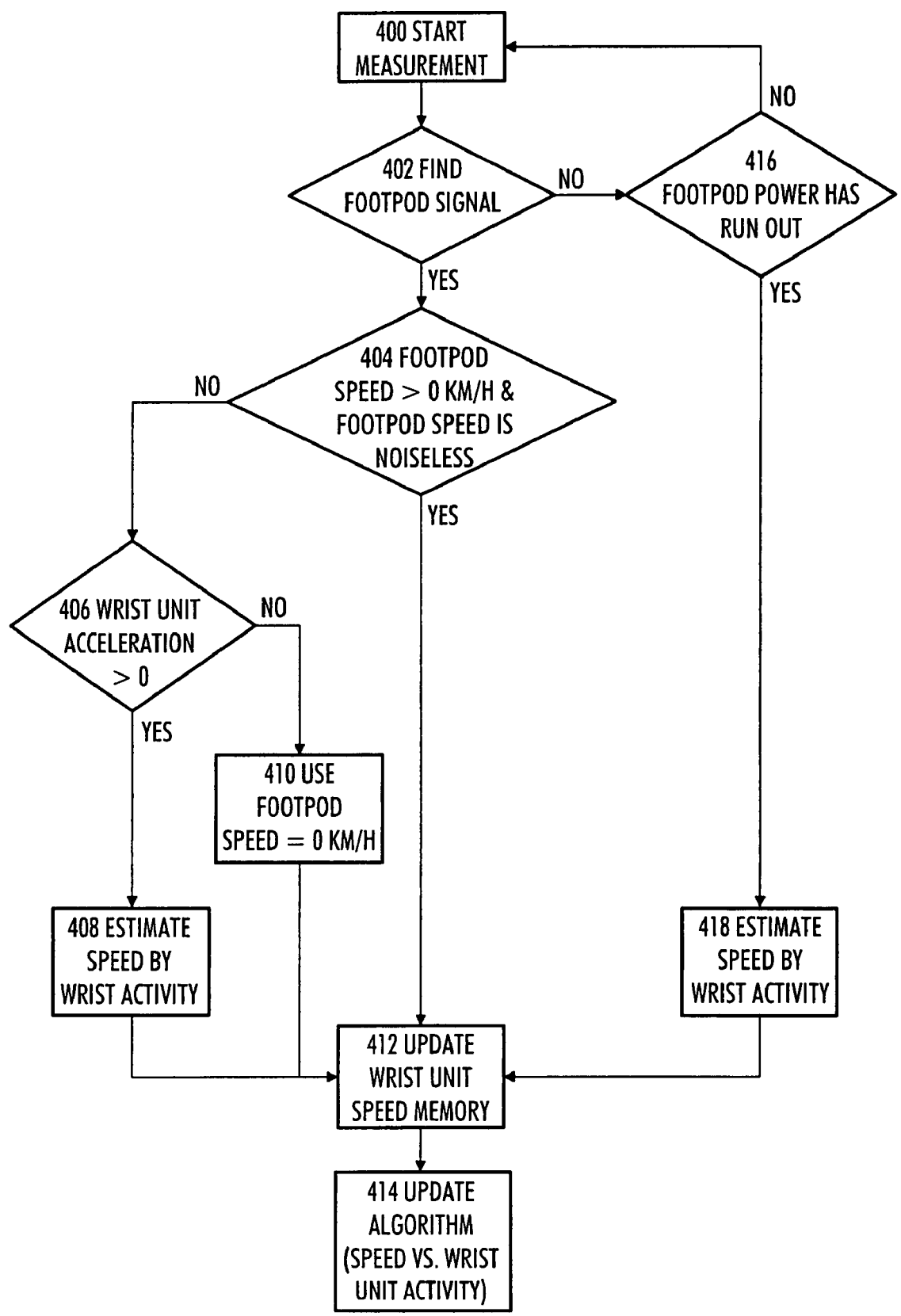

Next, a method will be described with reference to FIGS. 2, 3 and 4. The operations described in FIGS. 2, 3 and 4 are in no absolute chronological order and some of the operations may be performed simultaneously or in an order differing from the given one. Other functions, not described in this application, may also be executed between the operations or within the operations. Some of the operations or part of the operations may also be left out or replaced by a corresponding operation or part of the operation.

The method starts in 200. In 202 first motion data of a user is determined by a foot-worn first self-contained activity determining unit. In 204, second motion data of the user is determined by a second self-contained activity determining unit. Next, a user-specific dependency between the first motion data and the second motion data is determined and stored in 206. Finally, a current speed of the user or a current traveled distance of the user is determined based on current second motion data and the user-specific dependency in 208. The method ends in 210.

In an embodiment the first motion data comprises at least one of a speed of the user, a traveled distance of the user.

In another embodiment, the first motion data comprises foot motion data of the user, and the method further comprises: storing a further user-specific dependency between the foot motion data and the speed of the user or a traveled distance of the user; and utilizing the further user-specific dependency in the determination of the current speed of the user or the current traveled distance of the user.

The method described in FIG. 2 teaches and stores the user-specific dependency between the first motion data and the second motion data. Consequently, the method may thereinafter operate as illustrated in FIG. 3. The method starts in 300. The first operation is the same as in FIG. 2: second motion data of the user is determined by a second self-contained activity determining unit in 204. But the user-specific dependency between the first motion data and the second motion data is read from the memory in 302. Next, a current speed of the user or a current traveled distance of the user is determined based on the current second motion data and the user-specific dependency in 208. The method ends in 306.

Some further aspects of the method are illustrated in FIG. 4. The measurement starts in 400. In 402 it is checked whether a footpod signal is available.

If no footpod signal is available, it is checked whether footpod power has run out in 416. If the footpod power has run out, the speed is estimated by wrist activity in 418, and the speed memory in the wrist unit is updated (based on an estimated speed).

If the footpod signal is available, it is checked whether the footpod speed is higher than 0 km/h and the footpod speed is noiseless in 404. If the test in 404 evaluates 'yes', the speed memory in the wrist unit is updated (based on the footpod speed) in 412, else operation 406 is entered. In 406, it is tested whether the wrist unit acceleration is higher than zero. If the test in 406 evaluates 'yes', the speed is estimated by wrist activity in 408, else the footpod speed is set to 0 km/h in 410.

If the speed memory in the wrist unit was updated based on the footpod speed, then the algorithm (speed vs. wrist unit activity) may be updated in 414.

It will be obvious to a person skilled in the art that, as technology advances, the inventive concept can be implemented in various ways. The invention and its embodiments are not limited to the examples described above but may vary within the scope of the claims.

What is claimed is:

1. A portable apparatus comprising:
an interface configured to input first motion data representing movement of a user's foot from a foot-worn first self-contained activity determining unit; and
a second self-contained activity determining unit including:
an accelerometer configured to determine second motion data representing movement of a portion of the user other than the user's foot; and
a processing unit configured to determine a user-specific dependency between the first motion data and the second motion data, the processing unit further configured to determine a current speed of the user or a current traveled distance of the user based on current second motion data and the user-specific dependency.

2. The apparatus of claim 1, wherein the first motion data comprises at least one of a speed of the user, a traveled distance of the user.

3. The apparatus of claim 1, wherein the first motion data comprises foot motion data of the user, and the processing unit is further configured to store a further user-specific dependency between the foot motion data and a speed of the user or a traveled distance of the user, and utilize the further user-specific dependency in the determination of the current speed of the user or the current traveled distance of the user.

4. The apparatus of claim 1, wherein the portable apparatus is a wrist-worn or a torso-worn apparatus.

5. A method comprising:
receiving first motion data representing movement of a user's foot from a foot-worn first self-contained activity determining unit;
determining second motion data representing movement of a portion of the user other than the user's foot by an accelerometer of a second self-contained activity determining unit;
processing the first motion data and the second motion data to determine a user-specific dependency between the first motion data and the second motion data; and determining a current speed of the user or a current traveled distance of the user based on current second motion data and the user-specific dependency.

6. The method of claim 5, wherein the first motion data comprises at least one of a speed of the user, a traveled distance of the user.

7. The method of claim 5, wherein the first motion data comprises foot motion data of the user, and the method further comprises:
storing a further user-specific dependency between the foot motion data and a speed of the user or a traveled distance of the user; and
utilizing the further user-specific dependency in the determination of the current speed of the user or the current traveled distance of the user.

8. A system comprising:
a foot-worn first self-contained activity determining unit configured to determine first motion data representing movement of a user's users foot; and
a portable apparatus comprising:
an interface configured to input the first motion data from the foot-worn first self-contained activity determining unit;
an accelerometer configured to determine second motion data representing movement of a portion of the user other than the user's foot; and
a processing unit configured to determine a user-specific dependency between the first motion data and the second motion data, the processing unit further configured to determine a current speed of the user or a current traveled distance of the user based on current second motion data and the user-specific dependency.

9. The system of claim 8, wherein the first motion data comprises at least one of a speed of the user, a traveled distance of the user.

10. The system of claim 8, wherein the first motion data comprises foot motion data of the user, and the processing unit is further configured to store a further user-specific dependency between the foot motion data and a speed of the user or a traveled distance of the user, and utilize the further user-specific dependency in the determination of the current speed of the user or the current traveled distance of the user.

11. The system of claim 8, wherein the portable apparatus is a wrist-worn or a torso-worn apparatus.

12. A portable apparatus comprising:
means for receiving first motion data representing movement of a user's foot from foot-worn first self-contained activity determining means;
second self-contained activity determining means for determining second motion data representing movement of a portion of the user other than the user's foot;
means for determining a user-specific dependency between the first motion data and the second motion data; and
means for determining a current speed of the user or a current traveled distance of the user based on current second motion data and the user-specific dependency.

13. The apparatus of claim 12, wherein the first motion data comprises at least one of a speed of the user, a traveled distance of the user.

14. The apparatus of claim 12, wherein the first motion data comprises foot motion data of the user, and the apparatus further comprises means for storing a further user-specific dependency between the foot motion data and a speed of the user or a traveled distance of the user, and means for utilizing the further user-specific dependency in the determination of the current speed of the user or the current traveled distance of the user.

15. The apparatus of claim 12, wherein the portable apparatus is a wrist-worn apparatus.

16. The system of claim 8, wherein the portable apparatus that comprises a second self-contained activity determining unit that includes the accelerometer and the processing unit.

17. The apparatus of claim 1, wherein the accelerometer determines the second motion data based on the user's wrist movement or the user's torso movement.

18. The method of claim 5, wherein determining the second motion data is based on the user's wrist movement or the user's torso movement.

19. The system of claim 8, wherein the accelerometer determines the second motion data based on the user's wrist movement or the user's torso movement.

20. The apparatus of claim 12, wherein the second self-contained activity determining means determines the second motion data based on the user's wrist movement or the user's torso movement.

* * * * *

UNITED STATES PATENT AND TRADEMARK OFFICE
CERTIFICATE OF CORRECTION

| | | |
|---|---|---|
| PATENT NO. | : 7,774,156 B2 | Page 1 of 1 |
| APPLICATION NO. | : 11/777064 | |
| DATED | : August 10, 2010 | |
| INVENTOR(S) | : Niva et al. | |

It is certified that error appears in the above-identified patent and that said Letters Patent is hereby corrected as shown below:

TITLE PAGE ITEM [74]:

Now reads: "Hoffman & Baron, LLP"

Should read: -- Hoffmann & Baron, LLP --

IN THE PATENT:

Column 1, line 37:

Now reads: "distance so of the user"

Should read: -- distance of the user --

Signed and Sealed this

Eighth Day of March, 2011

David J. Kappos
*Director of the United States Patent and Trademark Office*